United States Patent
Chandra et al.

(10) Patent No.: US 11,258,714 B1
(45) Date of Patent: Feb. 22, 2022

(54) FINE GRAIN TRAFFIC SHAPING OFFLOAD FOR A NETWORK INTERFACE CARD

(71) Applicant: Google LLC, Mountain View, CA (US)

(72) Inventors: Prashant Chandra, San Jose, CA (US); Nandita Dukkipati, Menlo Park, CA (US); Vytautas Valancius, Redwood City, CA (US)

(73) Assignee: Google LLC, Mountain View, CA (US)

( * ) Notice: Subject to any disclaimer, the term of this patent is extended or adjusted under 35 U.S.C. 154(b) by 370 days.

(21) Appl. No.: 16/146,373

(22) Filed: Sep. 28, 2018

(51) Int. Cl.
| | | |
|---|---|---|
| *H04L 12/815* | (2013.01) | |
| *H04L 12/801* | (2013.01) | |
| *H04L 47/22* | (2022.01) | |
| *H04L 47/32* | (2022.01) | |
| *G06F 9/455* | (2018.01) | |
| *H04L 69/22* | (2022.01) | |
| *H04L 47/50* | (2022.01) | |
| *H04L 47/20* | (2022.01) | |

(52) U.S. Cl.
CPC .............. *H04L 47/22* (2013.01); *G06F 9/455* (2013.01); *H04L 47/20* (2013.01); *H04L 47/323* (2013.01); *H04L 47/50* (2013.01); *H04L 69/22* (2013.01)

(58) Field of Classification Search
CPC ....... H04L 47/22; H04L 47/20; H04L 47/323; H04L 47/50; H04L 69/22; G06F 9/455
See application file for complete search history.

(56) References Cited

U.S. PATENT DOCUMENTS

| | | | |
|---|---|---|---|
| 5,802,278 A | 9/1998 | Isfeld et al. | |
| 6,377,583 B1 * | 4/2002 | Lyles ................. | H04Q 11/0478 370/230.1 |
| 6,501,731 B1 * | 12/2002 | Chong ...................... | G06F 9/54 370/230.1 |
| 6,956,818 B1 * | 10/2005 | Thodiyil ............... | H04L 47/522 370/230 |
| 7,106,693 B1 * | 9/2006 | Turner .................. | H04L 47/568 370/230 |
| 7,292,578 B1 | 11/2007 | Kerr et al. | |

(Continued)

FOREIGN PATENT DOCUMENTS

WO 2018136132 A1 7/2018

OTHER PUBLICATIONS

Radhakrishnan, Sivasankar, et al. "SENIC: Scalable NIC for End-Host Rate Limiting" In NSDI, vol. 14, pp. 475-488, Apr. 2, 2014.

(Continued)

*Primary Examiner* — Huy D Vu
*Assistant Examiner* — Bailor C. Hsu
(74) *Attorney, Agent, or Firm* — Lerner, David, Littenberg, Krumholz & Mentlik, LLP

(57) ABSTRACT

A network interface card with traffic shaping capabilities and methods of network traffic shaping with a network interface card are provided. The network interface card and method can shape traffic originating from one or more applications executing on a host network device. The applications can execute in a virtual machine or containerized computing environment. The network interface card and method can perform or include several traffic shaping mechanisms including, for example and without limitation, a delayed completion mechanism, a time-indexed data structure, a packet builder, and a memory manager.

20 Claims, 8 Drawing Sheets

(56) References Cited

U.S. PATENT DOCUMENTS

| | | | | |
|---|---|---|---|---|
| 7,486,617 | B2* | 2/2009 | Kokko | H04L 47/10 370/229 |
| 7,813,277 | B2* | 10/2010 | Okholm | H04L 69/12 370/230 |
| 8,174,984 | B2* | 5/2012 | Tripathi | G06F 13/385 370/235 |
| 8,660,137 | B2 | 2/2014 | Aloni et al. | |
| 9,762,502 | B1* | 9/2017 | Mogul | H04L 47/32 |
| 2011/0219141 | A1* | 9/2011 | Coile | G06F 13/4282 709/235 |
| 2012/0079143 | A1* | 3/2012 | Krishnamurthi | G06F 3/061 710/39 |
| 2014/0181249 | A1* | 6/2014 | Saeki | H04L 69/22 709/217 |
| 2017/0264554 | A1* | 9/2017 | Contavalli | H04L 47/22 |
| 2019/0132659 | A1* | 5/2019 | Bottari | H04L 12/46 |

OTHER PUBLICATIONS

International Search Report and Written Opinion from PCT/US2019/052560 dated Dec. 2, 2019, 12 pages.
International Preliminary Report on Patentability for PCT/US2019/052560 dated Apr. 8, 2021. 6 pages.

* cited by examiner

FINE GRAIN TRAFFIC SHAPING OFFLOAD FOR A NETWORK INTERFACE CARD

BACKGROUND

Traffic shaping is a technique that regulates network data traffic utilizing various mechanisms to shape, rate limit, pace, prioritize or delay a traffic stream determined as less important or less desired than prioritized traffic streams or to enforce a distribution of network resources across equally prioritized packet streams. The mechanisms used to shape traffic include classifiers to match and move packets between different queues based on a policy, queue-specific shaping algorithms to delay, drop or mark packets, and scheduling algorithms to fairly prioritize packet assignment across different queues. Traffic shaping systems employing these mechanisms are difficult to scale when considering requirements to maintain desired network performance for large numbers of traffic classes or when deploying traffic shaping systems in various network host architectures.

SUMMARY

At least one aspect is directed to a network interface card. The network interface card includes a network interface card memory configured to store a time-indexed data structure storing identifiers associated with respective communications to be transmitted by network interface card and sets of pointers. Each set of pointers corresponds to one of the identifiers stored in the time-indexed data structure. Each pointer in each set of pointers points to a location in the network interface card memory or a location in a host memory of a host computing device to which the network interface device is coupled. The network interface card includes scheduling logic. The scheduling logic is configured to receive a notification of a new communication originating from a source virtualized computing environment of a plurality of virtualized computing environments executing on the host computing device to be transmitted by the network interface card. The notification includes header data and a set of pointers to data to be included in the communication. The scheduling logic is configured to determine whether to drop the packet or to schedule transmission of the new communication based on available capacity in the network interface card memory allocated to the source virtualized computing environment. The scheduling logic is configured to, in response to determining to schedule transmission of the communication, store an identifier associated with the communication in the time-indexed data structure at a scheduled transmission time and store the set of pointers associated with the communication in the network interface card memory. The network interface card includes packet generation logic configured to upon the arrival of a scheduled transmission time of a communication for which an identifier is stored in the time-indexed data structure, generate a data packet using the set of pointers stored in the network interface card memory associated with the communication. The network interface card includes a transceiver configured to transmit the generated data packets. The network interface card includes transmission completion logic configured to, upon completion of transmission of a data packet generated for a communication, generate a transmission completion message to be communicated to an application executing in the source virtualized computing environment that originated the communication.

At least one aspect is directed to a method of network traffic shaping. The method includes receiving, at a network interface card of a host computing device, a notification of a new communication originating from a source virtualized computing environment of a plurality of virtualized computing environments executing on the host computing device to be transmitted by the network interface card. The notification includes header data and a set of pointers to data to be included in the communication. The method includes determining whether to drop the packet or to schedule transmission of the new communication based on available capacity in a network interface card memory space allocated to the source virtualized computing environment. The method includes storing, in response to determining to schedule transmission of the communication, an identifier associated with the communication in a time-indexed data structure at a scheduled transmission time; and a set of pointers associated with the communication in the network interface card memory. The set of pointers corresponds to the identifier stored in the time-indexed data structure and each pointer in the set of pointers points to a location in the network interface card memory or a location in a host memory of the host computing device. The method includes generating, upon the arrival of a scheduled transmission time of the communication for which the identifier is stored in the time-indexed data structure, a data packet using the set of pointers stored in the network interface card memory associated with the communication. The method includes transmitting the generated data packet. The method includes generating, upon completion of transmission of a data packet generated for a communication, a transmission completion message to be communicated to an application executing in the source virtualized computing environment that originated the communication.

At least one aspect is directed to a non-transitory computer-readable medium having stored thereon instructions configured to cause one or more processors of a network interface card of a host computing device to execute a method network traffic shaping comprising. The method includes receiving a notification of a new communication originating from a source virtualized computing environment of a plurality of virtualized computing environments executing on the host computing device to be transmitted by the network interface card. The notification includes header data and a set of pointers to data to be included in the communication. The method includes determining whether to drop the packet or to schedule transmission of the new communication based on available capacity in a network interface card memory space allocated to the source virtualized computing environment. The method includes storing, in response to determining to schedule transmission of the communication, an identifier associated with the communication in a time-indexed data structure at a scheduled transmission time and a set of pointers associated with the communication in the network interface card memory. The set of pointers corresponds to the identifier stored in the time-indexed data structure and each pointer in the set of pointers points to a location in the network interface card memory or a location in a host memory of the host computing device. The method includes generating, upon the arrival of a scheduled transmission time of the communication for which the identifier is stored in the time-indexed data structure, a data packet using the set of pointers stored in the network interface card memory associated with the communication. The method includes generating, upon completion of transmission of a data packet generated for a communication, a transmission completion message to be communicated to an application executing in the source virtualized computing environment that originated the communication.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
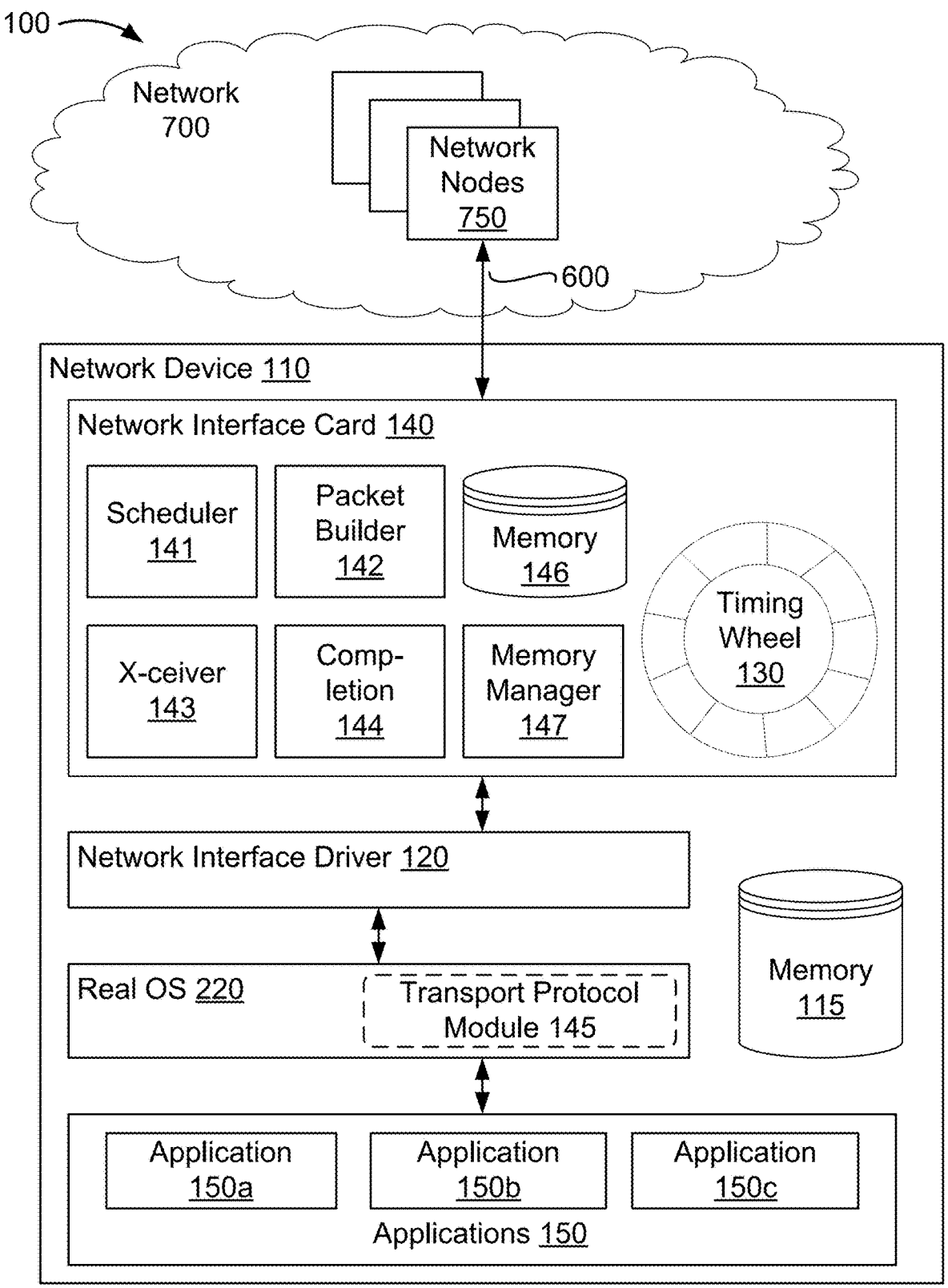
FIG. 1 is a block diagram of a network environment with a network device according to some implementations.

This disclosure relate generally to a system and method for fine grain traffic shaping for a network interface card. Traffic shaping is a technique that regulates network data traffic utilizing various mechanisms to shape, rate limit, pace, prioritize, or delay a traffic streams determined as less important or less desired than prioritized traffic streams, or to enforce a distribution of network resources across equally prioritized packet streams. Mechanisms used to shape traffic include classifiers to match and move packets between different queues based on a policy, queue-specific shaping algorithms to delay, drop or mark packets, and scheduling algorithms to fairly prioritize packet assignment across different queues. Traffic shaping systems employing these mechanisms are difficult to scale when considering requirements to maintain desired network performance for large numbers of traffic classes or when deploying traffic shaping systems in various network host architectures.

Traffic shaping systems should be designed for efficient memory usage and host processor power consumption while managing higher level congestion control, such as that used in the transmission control protocol (TCP). Traffic shaping systems can include a number of different mechanisms and/or techniques for efficiently and reliably controlling flows from multiple to many different virtual machines and/or application instances sharing bandwidth through a network interface card. The various traffic shaping mechanisms and techniques described herein include a delayed completion mechanism, a time-indexed data structure, a packet builder, and a memory manager.

Traditionally, traffic shaping mechanisms have executed within an OS or a network interface driver of a network device. Embodiments of the present disclosure can execute the delayed completion mechanism, time-indexed data structure, packet builder, and memory manager on logic in the network interface card itself. Executing these mechanisms in the network interface card can improve the throughput of the network interface card while reducing the computational load on the network device. In some implementations, the traffic shaping mechanisms can execute on logic in a microprocessor, a field-programmable gate array (FPGA), or an application-specific integrated circuit (ASIC) incorporated into the network interface card.

The delayed completion mechanism can delay, pace or rate limit packets to avoid bursts or unnecessary transmission delays. Using delayed completions can achieve higher utilization of network resources and host processing resources. A packet delay mechanism can reduce the need for large memory buffers. For example, when a packet is delayed, a feedback mechanism can exert "back pressure," that is, send feedback to a sending module (e.g., device or software component such as a software application) so as cause a sending module to reduce the rate at which it sends packets. The delayed completion mechanism may prevent the applications from sending additional packets for transmission until the application receives a message confirming the previously forwarded packets have successfully been transmitted. For example, the delayed completion mechanism communicates a packet transmission completion message to the sending module—for example, a software application or a guest operating system—that can refrain from requesting additional packet transmissions by the network interface card until it receives the transmission completion message indicating completion of the previously requested packet transmission. As described herein, in some implementations, the network interface card processes the received packets to determine a transmission time for each packet based on a traffic shaping policy stored on the network interface card. For example, a rate limit policy may include a rate pacing policy or a target rate limit. Additionally or alternatively, the rate limit policy may include a specific policy associated with a particular class of packets or an aggregate rate for a particular class of packets. Without packet delay mechanisms, a sending module may continue to generate packets, which may be buffered or dropped, costing additional memory and host processor power to queue or regenerate the packets.

The network interface card can store identifiers associated with the respective packets in a time-indexed data structure at a position associated with the transmission times determined for the respective packets. The time-indexed data structure may include a single time-based queue, such as a timing-wheel or calendar queue data structure, to receive identifiers associated with packets from multiple queues or TCP sockets. Packet identifiers may be inserted and extracted based on the determined transmission time. In some implementations, the network interface card can determine that a time indexed in the single time-indexed queue has been reached, and in response, transmit a packet associated with the identifier stored in the time-indexed data structure at a position associated with the reached time. For example, the network interface card or network interface card may determine that time $t_0$ has been reached and, as a result, the network interface card and/or network interface driver can cause a packet associated with an identifier specifying a $t_0$ transmission time to be transmitted by the network interface card of the network device. In some implementations, subsequent to the network interface card transmitting the packet, the network interface card may communicate a transmission completion notification back to the application that originated the transmitted packet. The time-indexed data structure can be used in conjunction with the delayed completion mechanism. In some implementations, the network device is configured to receive packets at the TCP layer of a network device from a plurality of applications. The received packets originate from applications executing on a host computing device, for example, on one or more virtual machines or containerized execution environments (collectively referred to herein as "virtualized computing environments") hosted by the host computing device.

The packet builder can build packets for transmission based on the packet identifiers in the time-indexed data structure and associated respective sets of pointers stored in the network interface card memory. Each identifier can be, for example, a pointer to a region in memory that contains the set of pointers. Each set of pointers includes a plurality of pointers, where each pointer points to a memory location in the host memory that stores a portion of the data that will make up the packet associated with the identifier. When the time-indexed data structure reaches a time corresponding to a transmission time of an identifier in the time-indexed data structure, the packet builder can use the identifier to retrieve the set of pointers from the network interface card memory, and use the set of pointers to build the packet for transmission. In some implementations, the set of pointers can take the form of a scatter gather list. Each pointer in the set of pointers can point to a region in the memory containing an appropriate field, component, or payload of the packet. The packet builder can thus build the packet header and payload based on the set of pointers. In some implementations, the packet builder can access the host memory directly using, for example, direct memory access (DMA). By maintaining only a single identifier in the time-indexed data structure, the size of the time-indexed data structure can be minimized. Furthermore, by storing only the set of pointers in the network interface card memory, the network interface card need not store the entirety of all queued packets for transmission in its own local memory; thus, memory size of the network interface card can be minimized and transmission between the host network device and network card can be optimized. Furthermore, by using the packet identifier and sets of pointers for scheduling and other traffic shaping operations in the network interface card, the network interface card can receive a notification and schedule (or not) a packet transmission without having to receive the bulk of the packet data. Therefore, traffic bursts from applications to the network interface card may be much smaller in terms of bytes per second, and will be less likely to overwhelm the available bandwidth of the interface between the host device and the network interface card. The network interface card need only receive the bulk of the data for a packet when that packet is ready for imminent transmission. Moreover, the network interface card need never receive the bulk of the data for a packet that is not scheduled for transmission (due to, for example, the notification being dropped due to a lack of available capacity in the network interface card memory allocated to the virtual machine from which the notification originated). Thus, the host to network interface card interface bandwidth is preserved for packets that will actually be transmitted, and bandwidth is used at substantially the rate of transmission, which is controlled by the network interface card itself, rather than by the applications, virtual machines, or containers that generate the packets. This can be particularly valuable when there is little to no coordination between the packet generating applications, virtual machines, or containers.

The network interface card can implement a memory manager that can control the amount of network interface card resources available to each virtual machine or container executing on the network device. In some cases, each virtual machine may execute many applications (dozens or more). Other methods of traffic shaping, such as delayed completion, can control the traffic originating at individual application instances, or on a flow-by-flow basis. In a cloud computing environment, however, it may be possible for a single virtual machine or container to concurrently execute many applications. For example, it may be possible for a single virtual machine or container to host a hundred or more applications, all trying to transmit packets concurrently. Other traffic shaping mechanisms may employ different transmission queues for different classes of traffic; however, these mechanisms also lack an ability to differentiate traffic by source. Thus, for host devices hosting virtual machine or containerized environments, it can be beneficial to have separate traffic shaping control capabilities for each virtual machine or container. The memory manager can provide separate traffic shaping controls for each virtual machine or container by allocating portions of network interface card memory available to each virtual machine or container. The memory manager can thus ensure that no single virtual machine or container is able to overload the resources of the network interface card to the detriment of other virtual machines or containers. For example, scheduling logic of the network interface card can cause a packet to be dropped based on a lack of available capacity in the network interface card memory allocated by the memory manager to the source virtualized computing environment. If there is capacity available to the source virtualized computing environment, however, the scheduling logic can schedule transmission of the packet.

In the above-described implementations, packet sources, such as software applications running on a real OS of the host network device, on a guest OS of a virtual machine, or on an upper layer of a TCP stack in a guest OS managed by a hypervisor, need not to be aware of the traffic shaping policies or algorithms implemented on a network interface card. Therefore, costs in implementing network interface drivers and guest operating systems in virtual machine environments can be reduced. Moreover, packet sources also need not be aware of other configuration parameters, e.g., packet classification rules and other rate limiting policies. Therefore, traffic shaping can be performed in a more reliable manner than a method in which an application or user configures such detailed algorithms and policies.

FIG. 1 is a block diagram of an example network environment 100 with a network device 110. In broad overview, the illustrated network environment 100 includes a network 700 of interconnected network nodes 750. The network nodes 750 participate in the network 700 as data sources, data destinations (or data sinks), and/or intermediary nodes such as switches, routers, and/or gateways propagating data from sources towards destinations through the network 700. The network 700 includes the network device 110 with links 600 to various other participating network nodes 750. Referring to FIG. 1 in more detail, the network 700 is a network facilitating interactions between participant devices. An illustrative example network 700 is the Internet; however, in other implementations, the network 700 may be another network, such as a local network within a data center, a network fabric, or any other local area or wide area network.

The network 700 may be composed of multiple connected sub-networks or autonomous networks. The network 700 can be a local-area network (LAN), such as a company intranet, a metropolitan area network (MAN), a wide area network (WAN), an inter-network such as the Internet, or a peer-to-peer network; for example, an ad hoc WiFi peer-to-peer network. Any type and/or form of data network and/or communication network can be used for the network 700. It can be public, private, or a combination of public and private networks. In general, the network 700 is used to convey information between computing devices; for example, network nodes 750, and the network device 110 of the data traffic shaping system facilitates this communication according to its configuration.

Figure 5:
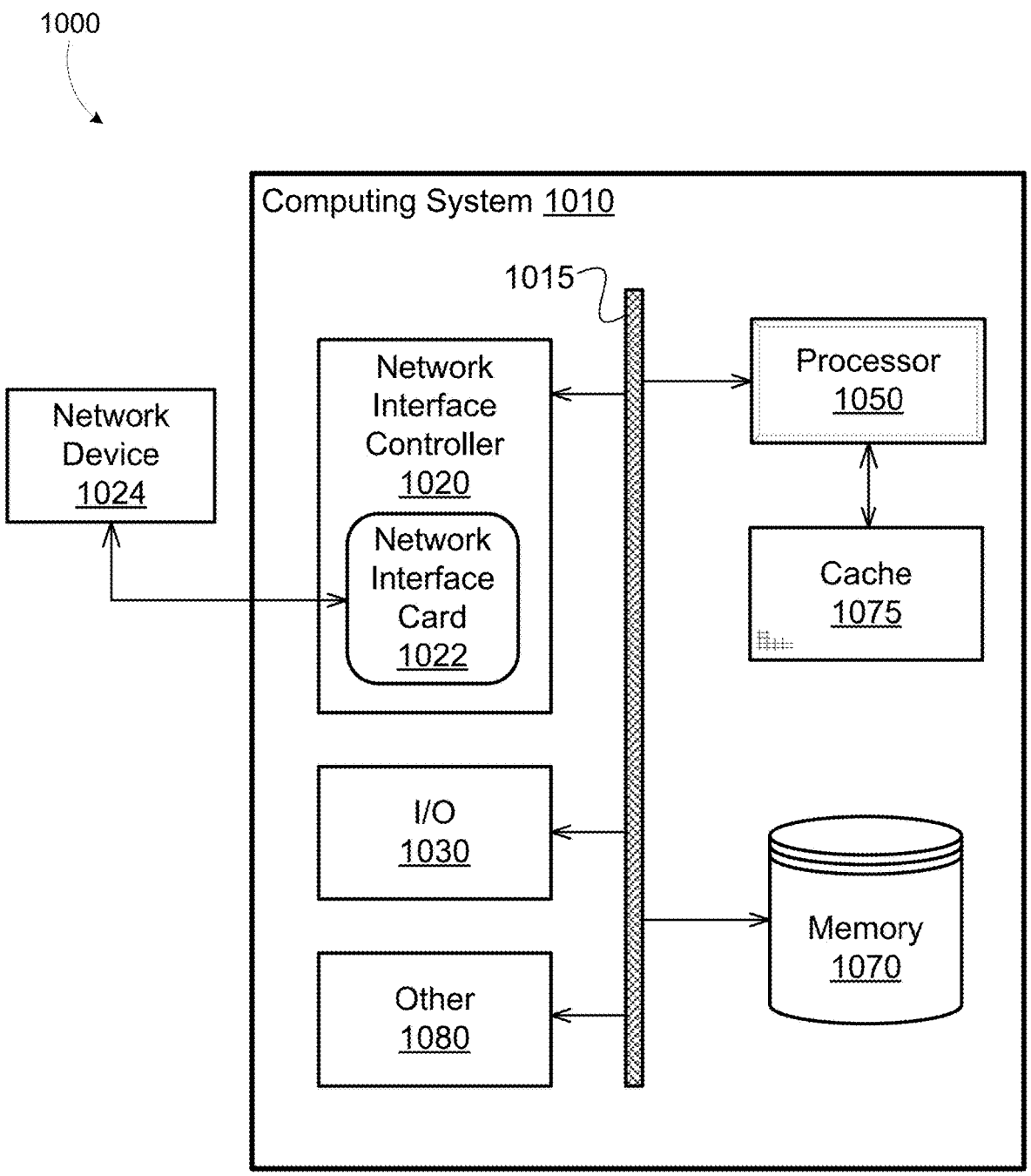
FIG. 5 is a block diagram of an example computing system that may be employed to implement elements of the systems and methods described and illustrated herein, according to an illustrative implementation.

As shown in FIG. 1, the network device 110 is a host or server hosting one or more applications 150a-150c (generally applications 150) executing on a real operating system (OS). As discussed further below, in other implementations, the network device 110 can be a server hosting virtual machines or containers that are executing applications 150. The network device 110 includes a network interface driver 120, a memory 115, a network interface card 140, a real OS 220 and applications 150. The network interface card 140 includes a scheduler 141, a packet builder 142, a transceiver 143, transmission completion logic 144, a memory manager 147, and a memory 146. The memory 146 can include a time-indexed data structure such as a timing wheel 130, although for clarity the timing wheel 130 is illustrated as external to the memory 146. In some implementations, the network device 110 has configuration similar to that of a computing system 1010 as shown in FIG. 5. For example, the memory 115 can have a configuration similar to that of a memory 1070 as shown in FIG. 5, and the network interface card 140 can have configuration similar to that of a network interface card 1022 and/or a network interface controller 1020 as shown in FIG. 5. The computing system 1010 is described in more detail below, in reference to FIG. 5. The elements shown in the computing system 1010 illustrated in FIG. 5 do not all need to be present in some implementations of the network device 110 illustrated in FIG. 1.

Referring again to FIG. 1, in some implementations, the network device 110 hosts one or more applications 150 (for example applications 150a, 150b and 150c). One or more of the applications 150a-150c can be software applications running on a real operating system of the network device 110. As discussed in further in relation to FIGS. 2A and 2B, in some implementations, one or more of the software applications 150a-150c can be a software application running on a guest OS managed by a hypervisor in a virtual machine environment, or an upper layer of a protocol stack (e.g., the TCP stack) of a guest OS of the virtual machine environment. For example, referring to FIG. 2A, the applications 150a-150c can each be a software application 230 running on a real OS 220, a software application 265 running on a guest OS 260 of Virtual Machine 1, managed by a hypervisor 250, or an upper layer of a protocol stack 261 of the guest OS 260 of Virtual Machine 1 in FIG. 2A. The hypervisor 250 and a virtual machine environment related thereto are described in more detail below in reference to FIG. 2A.

Referring back to FIG. 1, the network device 110 includes the memory 115. In some implementations, the memory 115 may store computer executable instructions of a transport protocol module 145 (such as a TCP protocol module or the TCP layer of the network stack) to be executed on a processor of the network device 110. In some other implementations, the memory 115 may store computer executable instructions of a network interface driver 120. The memory 115 may store data and/or instructions related to the operation and use of the network interface driver 120. The memory 115 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

The functionality described above as occurring within the TCP layer of a network device can be additionally or alternatively executed in another network protocol module within the transport layer, the network layer or a combined transport/network layer of a network protocol stack. For example, the functionality can be implemented in a user datagram protocol (UDP) module, reliable datagram protocol (RDP) module, reliable user datagram protocol (RUDP) module, or a datagram congestion control protocol (DCCP) module. As used herein, a network layer, a transport layer, or a combined transport/network layer will generally be referred to as a packet layer of the network protocol stack.

The network interface driver 120 can include a network interface driver software module running on a real OS. A network interface driver, such as the network interface driver 120, can be a collection of computer executable instructions stored in the memory 115 that when executed by a processor help facilitate network communications. In some other implementations, the network interface driver 120 may be implemented as logic implemented in a hardware processor or other integrated circuit, or as a combination of hardware and software logic. The network interface driver 120 can communicate with one of the software applications 150a-150c (e.g., the application 265 in FIG. 2A) directly (if operating on the real OS 220 of the network device 110), via a guest OS of a virtual machine (or in some implementations, through a hypervisor and the guest OS) (if operating in a virtual machine environment), or via a container manager of a containerized environment. In some implementations, the network interface driver 120 is included within a first layer of a transmission control protocol (TCP) stack of the real OS of the network device 110 and communicates with a software module or application that is included in an upper layer of the TCP stack. In one example, the network interface driver 120 is included within a transport layer of a TCP stack and communicates with a software module or application that is included in an application layer of the TCP stack. In another example, the network interface driver 120 is included within a link layer of a TCP stack and communicates with a TCP/IP module that is included in an internet/transport layer of the TCP stack. In some implementations, the functionality is additionally or alternatively configured to receive packets from another network or transport layer protocol module, such as a user datagram protocol (UDP) module, reliable datagram protocol (RDP) module, reliable user datagram protocol (RUDP) module, or a datagram congestion control protocol (DCCP) module. In some other implementations, the network interface driver 120 can be included as a portion of the network interface card 140.

The network interface card 140 includes a network interface card memory 146. In some other implementations, the memory 146 may store computer executable instructions of a network interface card 140. The memory 146 may store data and/or instructions related to the operation and use of the network interface card 140. The memory 146 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. Additionally, or alternatively, the memory 146 may store rate limiting algorithms, rate limiting policies, or computer executable instructions utilized by the scheduler 141 and other modules and logic of the network interface card 140. In some implementations, the memory 146 may store statistics or metrics associated with a flow or classes of packets that have already been transmitted by the network device 110 and/or that have been scheduled for future transmission. For example, the memory 146 may store statistics or metrics such as prior and upcoming transmission times and historic transmission rates of packets in each class of packets for which rate limits are to be applied. The statistical data may also include the number of packets currently in the timing wheel 130 (discussed further below) associated with each class. In some implementations, the memory 146 stores computer executable instructions, which when executed by the network interface card 140, cause the network interface card 140 to carry out process stages shown in FIG. 3, which are described further below.

As mentioned above, the network interface card 140 includes a scheduler 141. A scheduler, such as the scheduler 141, can be a collection of computer executable instructions, stored for example in the memory 146, that when executed by a processor cause the functionality discussed below to be implemented. In some other implementations, the scheduler 141 may be implemented as logic implemented in a hardware processor or other integrated circuit, or as a combination of hardware and software logic. In some implementations, the scheduler 141 is utilized to manage the sequence of packet identifiers inserted into and extracted from the timing wheel data structure 130. In some implementations, before making scheduling, or any decision, the scheduler 141 can a) copy at least packet headers to the network interface card memory 146, b) prepare descriptors that point to packet headers and packet payloads (which may or may not be copied to the network interface card memory 146), and c) execute scheduling decisions and queue an identifier of the descriptor in the time-indexed data structure 130.

Additionally, or alternatively, the scheduler 141 may implement known, existing network scheduling algorithms available for different operating system kernels. In some implementations, the scheduler 141 may implement custom, user-defined scheduling algorithms. For example, the scheduler 141 may include rate limiting policy algorithms capable of calculating timestamps for received packets. In some implementations, the scheduler 141 may implement a weighted fair queuing algorithm to ensure multiple packet flows share bandwidth proportionally to their weights in a min-max fairness allocation scheme. Additionally, or alternatively, the scheduler 141 may consolidate timestamps such that larger timestamps represent smaller target transmission rates. In some implementations, the scheduler 141 may store and/or retrieve rate limiting scheduling algorithms from the memory 146. Additionally, or alternatively, scheduler 141 may evaluate packets received by the network interface driver 120 and store packet identifiers in the timing wheel data structure 130. In some implementations, the scheduler 141 may evaluate received packet data to determine a transmission timestamp associated with the received packet. Additionally, or alternatively, the scheduler 141 may determine an updated transmission timestamp for a packet received already having a timestamp applied by the application, virtual machine, or container originating the packet, and may apply the updated transmission timestamp to the packet identifier. In some implementations, the scheduler 141 may instruct the timing wheel data structure 130 to store a packet identifier with a transmission timestamp at the appropriate timeslot in the timing wheel data structure 130. Additionally or alternatively, the scheduler 141 may instruct the timing wheel 130 to extract a stored packet identifier, for example, a packet identifier including a transmission timestamp, when the transmission time has been reached. The scheduler 141 is described in more detail below in reference to FIGS. 4A-4C.

The network interface card 140 can also include memory allocation logic, such as the memory manager 147. The memory manager 147 can enforce limits on the amount of memory space in the memory 146 is made available to each virtual machine or container executing on the network device 110. (Relationships between virtual machines or containers and applications executing on the network device 110 are described in further detail below with reference to FIGS. 2A and 2B.) In some cases, each virtual machine or container may execute many applications (dozens or more). The memory manager 147 can allocate portions of the memory 146 to each virtual machine or container. The memory manager 147 can thus ensure that no single virtual machine or container is able to overload the memory 146 to the detriment of applications executing in other virtual machines or containers.

The network interface card 140 has a configurable amount of memory 146 that can be allocated for pointers; i.e., packet descriptors. The configurable amount of memory 146 for descriptors must be balanced with the need for capacity for routing tables and/or executable code. The configurable amount of memory 146 must then be shared among all producers of packets to be transmitted by the network interface card 140, where the producers can include virtual machines, jobs on the host OS, etc. It is possible for sharing among the producers can be oversubscribed (based on the assumption that not all producers will use their entire allocation simultaneously). The memory manager 147 can have several configurable limits for each producer; for example, different limits for packets having different quality-of-service (QoS) flags. For example, the memory 146 can store up to 100,000 packets, with 20,000 packets worth of capacity allocated to each of five producers. For each producer, the memory manager 147 can allow a producer to fill all 20,000 packet capacity with high-priority packets, but cap low-priority packets at 10,000 per producer. It would also be possible in this example to allocate 20,000 packet capacity to each of six producers, resulting in an oversubscription of 20,000 packets' worth of capacity. But unless the combined producers were each maxing out their allocation with high-priority packets, the producers will not max out the total allocated memory 146.

In some implementations, the memory manager 147 can allocate memory based on one or more of a variety of other factors or calculations. For example, the memory manager 147 can allocate space in the memory 146 based on historical use of the memory 146 by certain virtual machines or containers. If a virtual machine or container typically uses up to, for example, 10 MB of space in the memory 146, the memory manager 147 can allocate that virtual machine or container 10 MB, or 10 MB plus an additional margin of 1 MB, 2 MB, 5 MB, or 10 MB, etc. In another example, the memory 147 can allocate space in the memory 146 based on predictions of how much capacity will be required by a given virtual machine or container. Some virtual machines or containers may use more capacity during different times of the day or week; thus, the memory manager 147 can employ a dynamic allocation scheme that varies memory allocation according to predictable changes in usage. In some implementations, memory allocation by the memory manager 147 can be user configurable.

In an example operation, when the network interface card 140 receives a notification of a new communication originating from a source virtualized computing environment (e.g., a virtual machine or container), the scheduler 141 can determine whether there is any capacity available to the source in the memory 146 based on the allocations made by the memory manager 147. If there is no capacity available to the source in the memory 146, the network interface card 140 can drop the packet. The scheduler 141 can drop the packet by a variety of mechanisms. For example, the scheduler 141 can simply ignore the notification; however, this mechanism would generally only be used if the scheduler 141 enforces a data rate cap on the application 150, such as a 20 Gbps cap. This mechanism would pose a more arbitrary manner of traffic shaping that may not be compatible with the fine grain traffic shaping disclosed herein. A second mechanism for dropping a packet can include acknowledging the notification, dropping the packet, and sending a completion message back to the application 150, if the application 150 has no quota left for packet transmission. Completion messages are discussed further below with regard to the transmission completion logic 144. A third mechanism involves slowing the packet sender—i.e., the application 150—rather than dropping the packet outright. If the scheduler 141 determines that there is capacity available to the source in the memory 146, and that the application 150 has some quota left for transmission, the scheduler 141 can acknowledge the notification, queue the packet to the timing wheel 130, transmit the packet at the scheduled time, and deliver the delayed completion message to the application 150.

As mentioned above and as shown in FIG. 1, the network interface card 140 includes a timing wheel data structure 130 (also referred to as the timing wheel 130). A timing wheel data structure is a time indexed queue, which can be implemented as a circular buffer, that is used to queue objects at given times in O(1) and fetch objects to be processed at a specific time in O(1). The time complexity of an algorithm may be estimated as a function of the number of elementary operations performed by the algorithm. This estimate may be represented in the form O(n). For example, an algorithm may be of constant time (e.g. O(n), where n=1) if the value of the running time, T(n), is bounded by a value that does not depend on the size of the input. As described above, accessing a single element (e.g. a packet identifier) in a timing wheel data structure takes constant time (e.g., O(1)) as only one operation has to be performed to locate the element. In some implementations, the timing wheel data structure 130 may store packet identifiers provided by the scheduler 141 in a timeslot associated with the timestamp specified by the application 150 that generated the packet or according to the updated transmission timestamp determined by the scheduler 141. When the current time reaches or passes the timestamp, the timing wheel 130 can push the packet identifier to the packet builder 142 for packet generation. In some implementation, another component such as the packet builder 142 or the scheduler 141 polls the timing wheel 130 periodically, and extracts packet identifiers whose timestamps have reached or passed the current time. The timing wheel data structure 130 and its operations are described in more detail below in reference to FIGS. 4A-4C. In some other implementations, instead of a timing wheel, a different time-indexed data structure, such as a calendar queue, can be used to schedule transmission of packets.

The network interface card 140 includes the packet builder 142. The packet builder 142 includes packet generation logic that can generate the data packet using a set of pointers stored in the memory 146 associated with the communication. Each pointer can be a network interface card descriptor. The descriptor can describe a packet; for example, by specifying a memory location and length of packet data. In some implementations, the packet data can be in the host memory 115. In some implementations, the packet data can be in the network interface card memory 146. The packet builder 142 can build packets for transmission based on the identifiers in the timing wheel 130.

An example operation of the packet builder 142 is as follows. When the current time reaches or passes a timeslot associated with a timestamp of a packet identifier, the timing wheel 130 can push the packet identifier to the packet builder 142 for packet generation and transmission. In some implementations, the packet builder 142 can be configured to query the timing wheel 130 to determine if a time indexed in the timing wheel 130 has been reached and to extract appropriate packet identifiers from the timing wheel 130 based on determining that their transmission time indexed in the timing wheel 130 has been reached. When the time-indexed data structure 130 reaches the time corresponding to a transmission time of an identifier in the time-indexed data structure, the timing wheel 130 can push the packet identifier to the packet builder 142, which can use the packet identifier to generate the packet for transmission. The identifier can be, for example, a pointer to a region in the memory 146 that contains the set of pointers associated with the packet identifier. The set of pointers can point to memory locations on the network interface card 140 or the network device 110 that each store portions of the data that makes up the packet associated with the identifier. In some implementations, the pointers can indicate memory addresses assigned by and accessible to the real OS of the network device 110. In some implementations, the pointers can indicate memory addresses assigned by and accessible to a virtual machine hypervisor or a container manager. In some implementations, the set of pointers can take the form of a scatter gather list. Each pointer in the set of pointers can point to a region in the memory 115 containing an appropriate field, component, or payload portion of the packet. The packet builder 142 can thus build the packet header and payload based on the set of pointers. In some implementations, the packet builder 142 can access the host memory 115 directly using, for example, direct memory access (DMA). By maintaining only a single identifier in the time-indexed data structure 130 for each packet or communication, the size of the time-indexed data structure can be minimized.

The network interface card 140 further includes the transceiver 143. The transceiver 143 includes hardware configured to send and receive communications to and from the network nodes 750. In some implementations, the network interface card 140 may be capable of supporting high speed data receipt and transmission as required, for example, in optical fiber channels where data frame rates may approach 100 gigabits per second. In some implementations, network interface card 140 may be configured to support lower speed communications, for example, over copper (or other metal) wire, a wireless channel, or other communications medium.

The network interface card 140 includes the transmission completion logic 144. When the network interface card 140 transmits the data packet, the transmission completion logic 144 can generate and send a transmission completion message to the source virtualized computing environment that originated the communication. The application 150 that requested transmission of the data packet can refrain from requesting additional packet transmissions until it receives a notification of completion of a previously requested packet transmission. The transmission completion message provides a feedback mechanism to the application 150 and limits the forwarding of additional packets by the application 150 to the TCP layer. This mechanism can be leveraged in conjunction with existing TCP functionality, such as TCP small queues that function to effectively limit the number of bytes that can be outstanding between the sender and receiver.

Figure 2A:
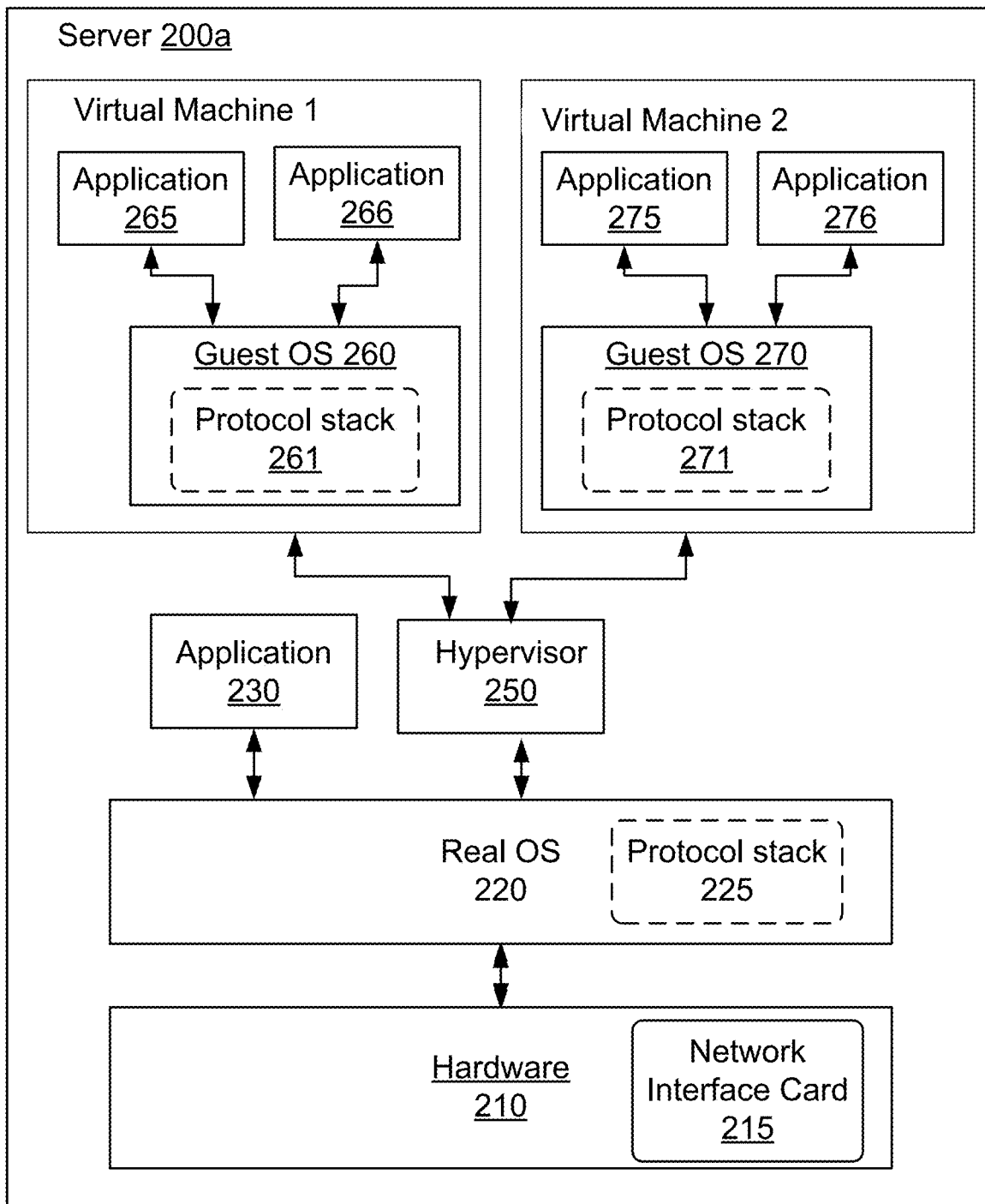
FIG. 2A is a block diagram of an example virtual machine environment.

FIG. 2A shows a block diagram of an example server 200a implementing a virtual machine environment. In some implementations, the server 200a includes hardware 210, a real operating system (OS) 220 running on the hardware 210, a hypervisor 250, and two virtual machines having guest operating systems (guest OSs) 260 and 270. The hardware 210 can include, among other components, a network interface card (NIC) 215. The hardware 210 can have a configuration similar to that of the computing system 1010 shown in FIG. 5. The NIC 215 of the hardware 210 can have configuration similar to that of the network interface card 140 as shown in FIG. 1. In some implementations, the real OS 220 has a protocol stack 225 (e.g., TCP stack) or a transport protocol module 145 as shown in FIG. 1. In some implementations, the real OS 220 includes a software application running on the real OS 220. In some implementations, the guest OSs 260 and 270 include protocol stacks 261 and 271, respectively. Each of the guest OSs 260 and 270 can host a variety of applications, e.g., software applications 265, 266, 275 and 276. The server 200a may be a file server, application server, web server, proxy server, appliance, network appliance, gateway, gateway server, virtualization server, deployment server, SSL VPN server, or firewall.

Referring again to FIG. 2A, the server 200a executes the hypervisor 250, which instantiates and manages the first guest OS 260 and the second guest OS 270 on Virtual Machine and Virtual Machine 2, respectively. The first guest OS 260, configured on Virtual Machine 1, hosts a first software application 265 and a second software application 266. The second guest OS 260, configured on Virtual Machine 2, hosts a third software application 275 and a fourth software application 276. For example, the applications can include database servers, data warehousing programs, stock market transaction software, online banking applications, content publishing and management systems, hosted video games, hosted desktops, e-mail servers, travel reservation systems, customer relationship management applications, inventory control management databases, and enterprise resource management systems. In some implementations, the guest OSs host other kinds of applications.

Figure 2B:
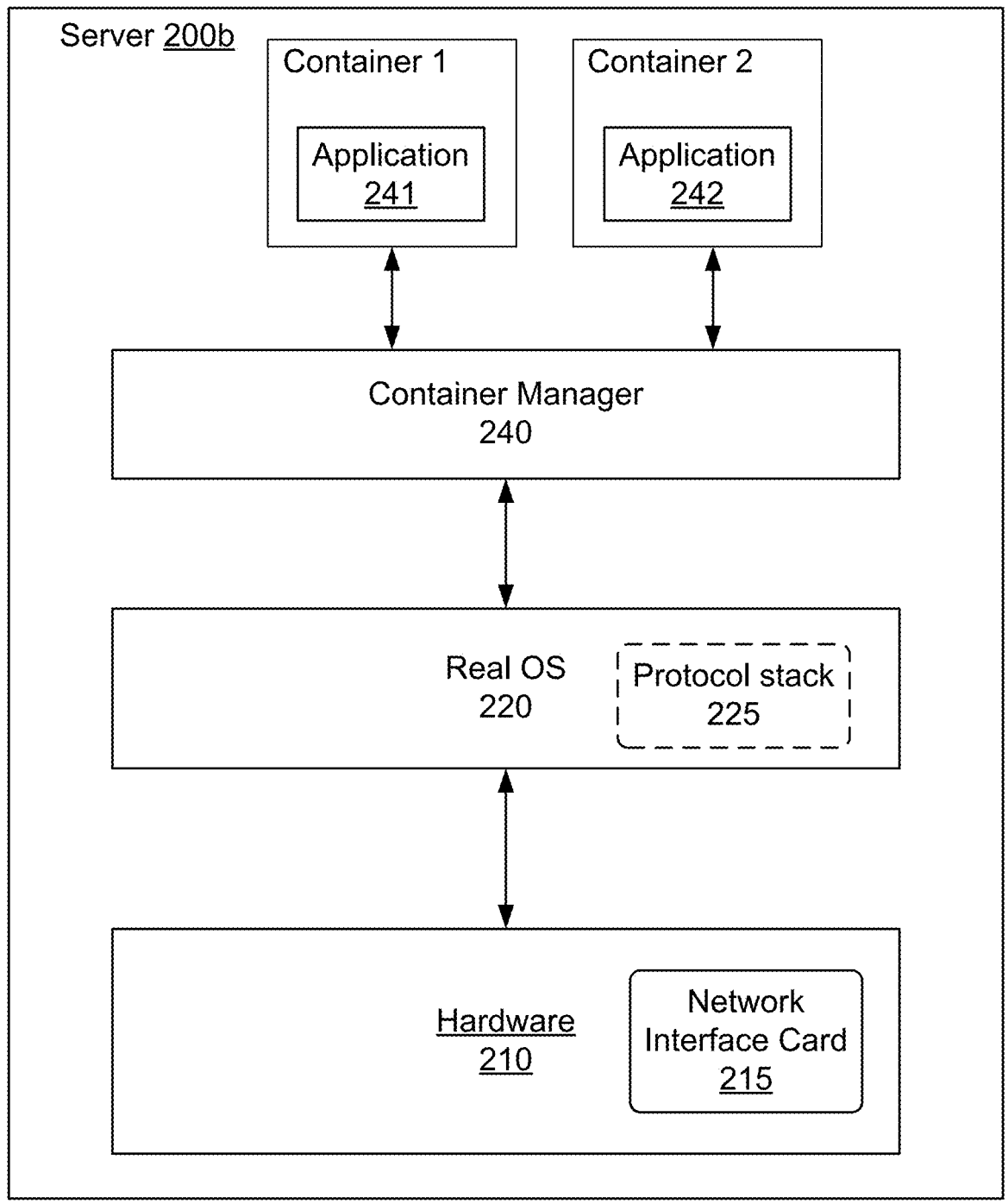
FIG. 2B is a block diagram of an example containerized environment.

FIG. 2B shows a block diagram of an example server 200b implementing a containerized environment. In some implementations, the server 200b includes hardware 210, a real operating system (OS) 220 running on the hardware 210, a container manager 240, two containerized environments (e.g., Container 1 and Container 2) executing applications 241 and 242, respectively. The hardware 210 can include, among other components, a network interface card (NIC) 215. The hardware 210 can have configuration similar to that of the computing system 1010 as shown in FIG. 5. The NIC 215 of the hardware 210 can have configuration similar to that of the network interface card 140 shown in FIG. 1. In some implementations, the real OS 220 has a protocol stack 225 (e.g., TCP stack) and has a software application running on the real OS 220. Each of the containers, (e.g., container 1 and container 2) can host a variety of applications, e.g., software applications 241 and 242. The server 200b may be a file server, application server, web server, proxy server, appliance, network appliance, gateway, gateway server, virtualization server, deployment server, SSL VPN server, or firewall.

Referring again to FIG. 2B, the server 200b executes the container manager 240, which instantiates and manages container 1 and container 2, respectively. Container 1 hosts a software application 241. Container 2 hosts a software application 242. For example, the applications can include database servers, data warehousing programs, stock market transaction software, online banking applications, content publishing and management systems, hosted video games, hosted desktops, e-mail servers, travel reservation systems, customer relationship management applications, inventory control management databases, and enterprise resource management systems. In some implementations, the containers (e.g., container 1 or container 2) may host other kinds of applications. In some implementations, each container may host multiple applications concurrently.

Figure 3:
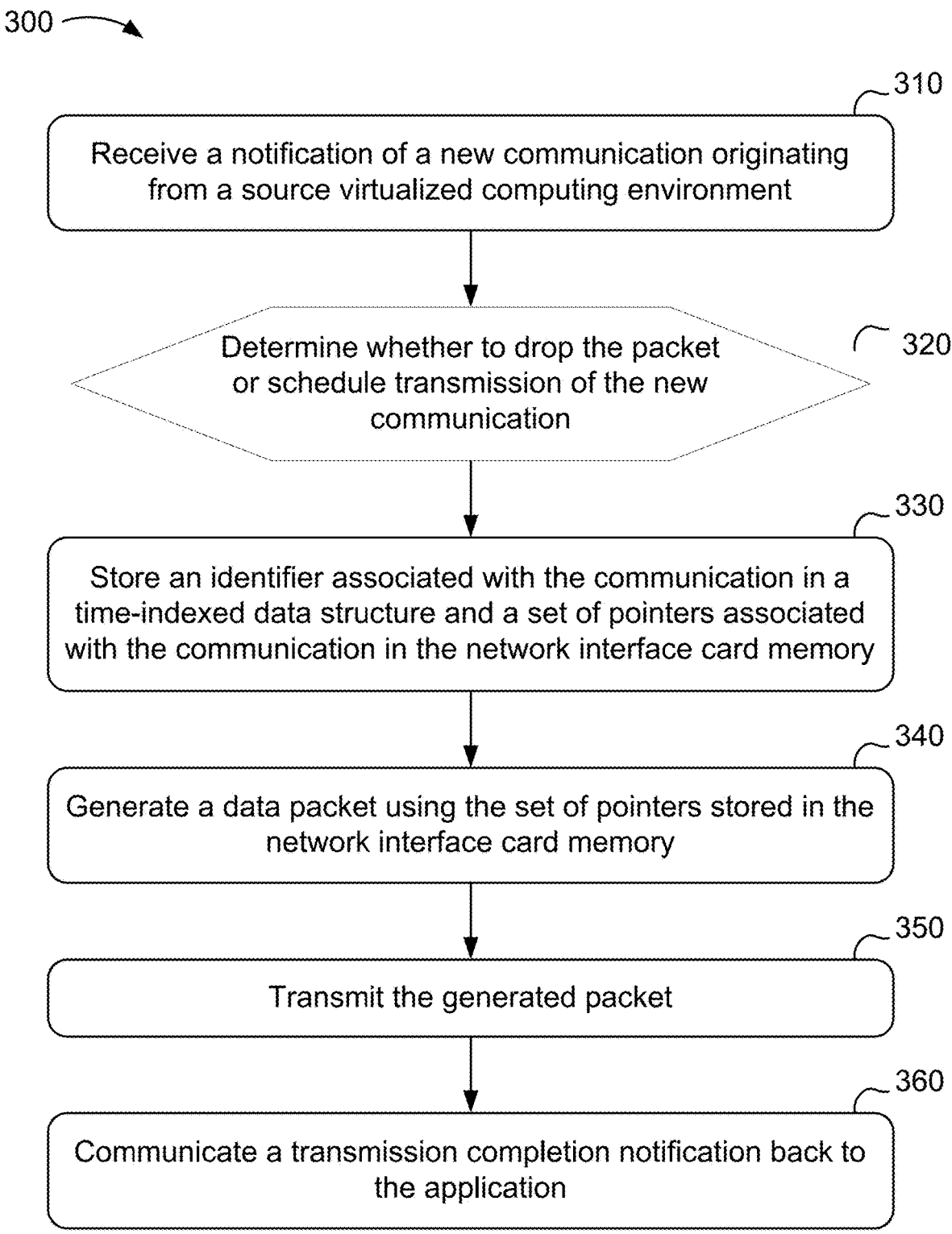
FIG. 3 is a flowchart showing operations of a network interface card according to some implementations.

FIG. 3 is a flowchart for network traffic shaping using an example method 300 performed by a network interface card, such as the network interface card 140 shown in FIG. 1. The method 300 includes receiving a notification of a new communication originating from a source virtualized computing environment (stage 310). The method 300 includes determining whether to drop the packet or schedule transmission of the new communication (stage 320). The method 300 includes storing an identifier associated with the communication in a time-indexed data structure and a set of pointers associated with the communication in the network interface card memory (stage 330). The method 300 includes generating a data packet using the set of pointers stored in the network interface card memory (stage 340). The method 300 includes transmitting the generated packet (stage 350). The method 300 includes communicating a transmission completion notification back to the application (stage 360).

The method 300 includes receiving a notification of a new communication originating from a source virtualized computing environment (stage 310). The notification of the new communication can include header data and a set of pointers to data to be included in the communication. The notification can include a requested transmit time. In some implementations, the plurality of applications generating packets may be applications hosted in one or more virtualized machine environments, such as any of applications 265, 266, 275 or 276 in FIG. 2A. Additionally, or alternatively, the received packets may be generated by an application executing on the real OS of a network host, such as application 230 in FIG. 2A. In some implementations, the applications may be included in a containerized environment, such as applications 241 or 242, as shown in FIG. 2B. Additionally, or alternatively, the TCP layer receiving the packets may be an upper layer protocol stack of a guest OS in a virtualized machine environment.

The method 300 includes determining whether to drop the packet or schedule transmission of the new communication (stage 320). The determination can be made by scheduling logic, such as the scheduler 141 previously described. The scheduler can determine whether to drop the packet or to schedule transmission of the new communication based on available capacity in a memory space allocated to the source virtualized computing environment in a memory of the network interface card, such as the memory 146. If the scheduler determines that there is no available capacity in the memory space allocated to the source, the scheduler can ignore the notification and drop the packet. If the scheduler determines that there is capacity available, the scheduler can schedule the packet for transmission by proceeding to stage 330.

The method 300 includes storing an identifier associated with the communication in a time-indexed data structure and a set of pointers associated with the communication in the network interface card memory (stage 330). The scheduler can store the identifier in the time-indexed data structure, such as the timing wheel 130 previously described. The time-indexed data structure may be configured to include multiple positions or time-slots to store data or events. The time-indexed data structure includes a time horizon which is the maximum period of time into the future that the data or events may be stored. For example, a time-indexed data structure may be configured to include 50 time-slots, where each time-slot represents the minimum time granularity between two events. If the time-indexed data structure including 50 slots was configured such that each time-slot represented a granularity of 2 microseconds, the time horizon would be 100 microseconds. In this example, no data or events would be scheduled beyond 100 microseconds into the future. A suitable time horizon and timing wheel granularity (e.g., the number of time-slots), may be configured based on the rate-limit policy to be enforced. For example, to enforce a rate of 1 megabit (Mb) per second, a suitable time horizon would be 12 milliseconds. A suitable number of time-slots or positions for the time-indexed data structure may be in the range of 10-1,000,000 time-slots or positions. A suitable time horizon for the time-indexed data structure may be in the range of microseconds to seconds. In some implementations, one or more timing wheels may be implemented hierarchically and each of the one or more timing wheels may be configured to have a different number of time-slots and a different timing wheel granularity. In this example, each of the one or more hierarchical timing wheels may have a different time horizon. In some implementations, a packet identifier may correspond to the timestamp requested by the application generating the packet or the adjusted transmission timestamp determined by the scheduler. For example, a packet may include an identifier which may specify a requested transmission time which is 10 microseconds from the current time. The scheduler may process the packet to determine whether, based on the rate limit policy associated with that particular class of packet, transmitting the packet immediately would exceed the rate limit. Assuming the rate limit is not exceeded, the scheduler 11 may insert the packet identifier into a time-indexed data structure at a position associated with a transmission time 10 microseconds in the future. In some implementations, the time-indexed data structure may act as a first-in, first-out (FIFO) queue if all packets have a time stamp of zero (e.g., transmission time is now) or any value smaller than now. For example, a packet identifier with a time stamp of zero will be transmitted immediately. Additionally, or alternatively, all packet identifiers with timestamps older than now are inserted into the data structure position with the smallest time so they can be transmitted immediately. Any packet identifiers with a timestamp that is beyond the time horizon of the time-indexed data structure are inserted into the last position in the data structure (e.g., the position that represents the maximum time horizon).

Also in stage 330, the scheduler, upon determining that source has available capacity allocated to it in the memory, can store the set of pointers associated with the communication in the network interface card memory.

In some implementations, the scheduler may process the received data packets to determine a transmission time for each packet based on a rate limiting algorithm or policy stored in memory. For example, the scheduler may process a packet and apply a transmission timestamp in accordance with a rate limiting algorithm or policy associated with the particular class of packets. In some implementations, the scheduler is configured to determine a transmission time for each packet based on a rate pacing policy or target rate limit. For example, the scheduler may determine a transmission time for each packet based on a rate pacing policy such as a packet class rate policy and/or an aggregate rate policy. In some implementations, the scheduler may determine transmission times based on a rate pacing policy such as a weighted fair queuing policy to process multiple packet flows. Additionally, or alternatively, each packet may have a transmission timestamp requested by the application generating the packet. In some implementations, the scheduler may receive packets including a requested transmission time assigned to the packet by one of the plurality of applications before being received at the TCP layer and before being processed by scheduler. The scheduler may process the packet in substantially real time to determine an updated transmission time based on at least one rate limiting policy being exceeded and invoking a rate limit algorithm associated with the packet. For example, if a received packet is processed and the scheduler determines that the transmission time for the packet will exceed the rate limit for packet class, the scheduler may update the transmission time with an adjusted transmission timestamp that enables the packet to be transmitted at a later time, to avoid exceeding the rate limit defined by the rate limit policy for the particular packet class. The scheduler may be configured to find the associated rate limit algorithm via a hash table or mapping identifying a rate limit algorithm associated with the received packet.

In some implementations, the scheduler may determine that a specific transmission time associated with a packet identifier stored in the time-indexed data structure 130 has been reached. The scheduler may query the time-indexed data structure 130 with the current time to determine whether there are any packets that are to be transmitted. For example, the scheduler may query the data structure using the current CPU clock time (or some other reference time value such as regularly incremented integer value). Frequent polling may provide a greater conformance with packet schedules and rate limit policies as well as reducing overhead compared to using separate timers which can cause significant CPU overhead due to interrupts. In some implementations, the time-indexed data structure 130 may be implemented on a dedicated CPU core. Additionally, or alternatively, the time-indexed data structure 130 may be implemented on an interrupt-based system which may perform polling of the data structure at a constant interval to determine packet transmission schedules. For example, the time indexed data structure 130 can be polled periodically with a period equal to the length of time associated with each time slot or a multiple thereof. In some implementations, the polling of the timing wheel can be carried out by logic distinct from the scheduler, such as a packet builder similar to the packet builder 142.

The method 300 includes generating a data packet using the set of pointers stored in the network interface card memory (stage 340). The packet can be generated by packet generation logic, such as the packet builder 142 previously described. Upon the arrival of a scheduled transmission time of a communication for which an identifier is stored in the time-indexed data structure, the packet builder can generate a data packet using the set of pointers stored in the network interface card memory associated with the communication. The packet builder can retrieve the data from the network device memory locations indicated by the pointers in the set of pointers, and generate the packet accordingly. For example, the set of pointers can be stored in the network interface card memory 146, and the set of pointers can indicate locations containing packet data in the network interface card memory 146 and/or the network device memory 115. In some implementations, the set of pointers is stored as a scatter gather list. In some implementations, the packet builder can access the host memory directly using, for example, direct memory access (DMA) to retrieve data stored in the memory locations indicated by the pointers in the set of pointers.

The method 300 includes transmitting the generated packet (stage 350). The network interface card can transmit the generated data packet over a network link such as one of the links 600 previously described. In some implementations, the network interface card may transmit the data packet based on reaching (or passing) the transmission time identified in the packet identifier that was stored in the time-indexed data structure. For example, scheduler or packet builder may poll the time-indexed data structure and may determine that the transmission time identified in a packet identifier has been reached. In response, the scheduler may instruct the network interface card to transmit the generated data packet. In some implementations, the scheduler may identify a transmission time older than now and in response, transmit the packet immediately.

In some implementations, the method 300 can prevent one of the applications from sending additional packets for transmission until the application receives a transmission completion notification. In some implementations, traffic shaping may be achieved in part by rate limiting the forwarding of additional data packets by an application to the TCP layer until a message is received indicating that a packet transmission has been completed. For example, a network interface card 140 (as shown in FIG. 1 and later described in more detail in FIGS. 6A-6B), may generate a completion notification back to an application 150 indicating that a packet has been transmitted over the network. This transmission completion notification provides a feedback mechanism to the application and limits the forwarding of additional packets by the application 150 to the TCP layer. This mechanism can be leveraged in conjunction with existing TCP functionality, such as TCP small queues that function to effectively limit the number of bytes that can be outstanding between the sender and receiver.

The method 300 includes communicating a transmission completion notification back to the application (stage 360). The network interface card can include transmission completion logic configured to communicate a completion notification back to the application originating a packet upon completion of transmission of the packet by network interface card. The completion notification allows the application 150 to send additional packets to the network interface card. The transmission completion notification mechanism is described in more detail below in reference to FIGS. 6A-6B.

The functionality described above as occurring within the TCP layer of a network device can be additionally or alternatively executed in another network protocol module within the transport layer, the network layer or a combined transport/network layer of a network protocol stack. For example, the functionality can be implemented in a user datagram protocol (UDP) module, reliable datagram protocol (RDP) module, reliable user datagram protocol (RUDP) module, or a datagram congestion control protocol (DCCP) module.

Figure 4A:
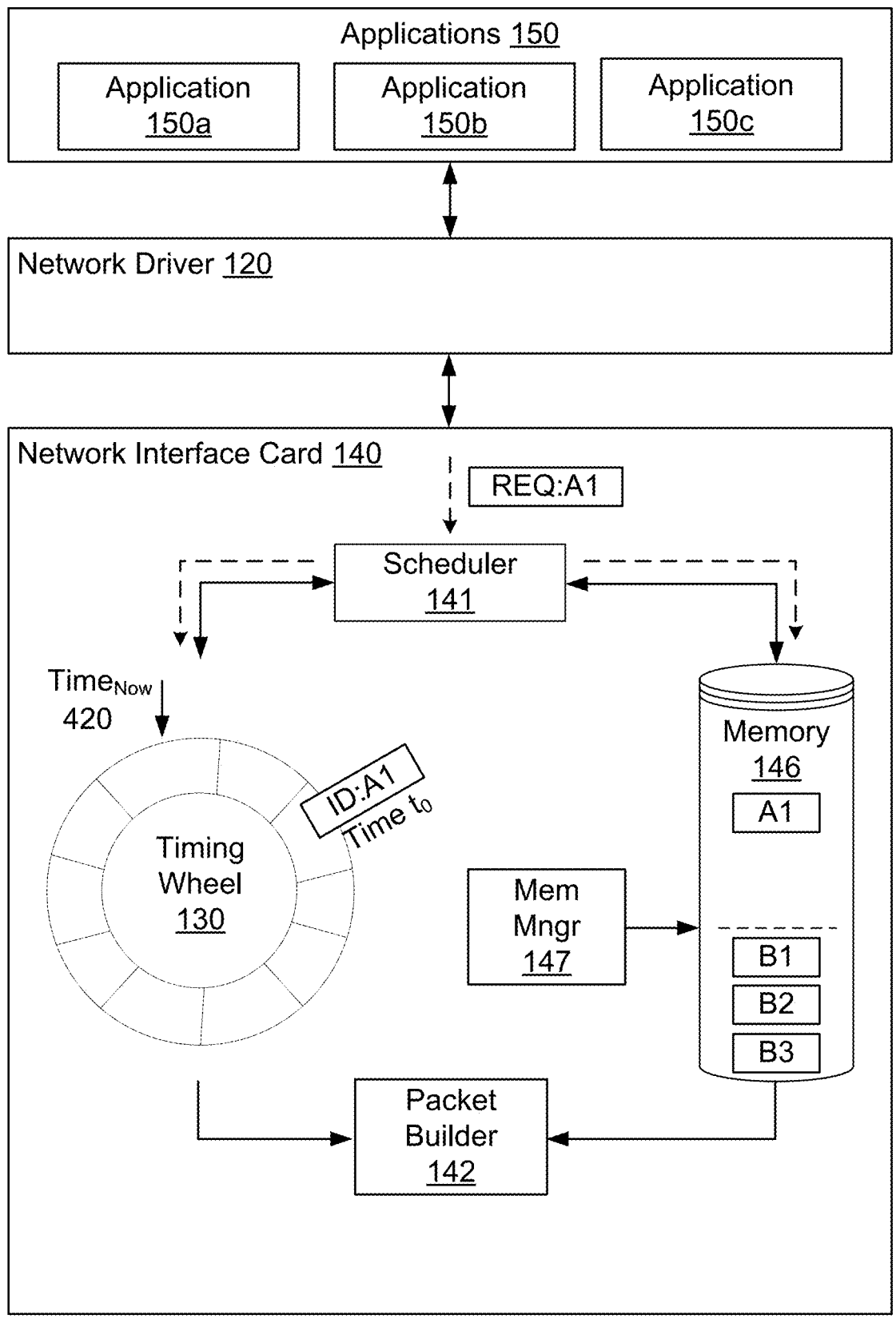
FIGS. 4A-4C are block diagrams showing operations of a network interface card according to some implementations.
Figure 4B:
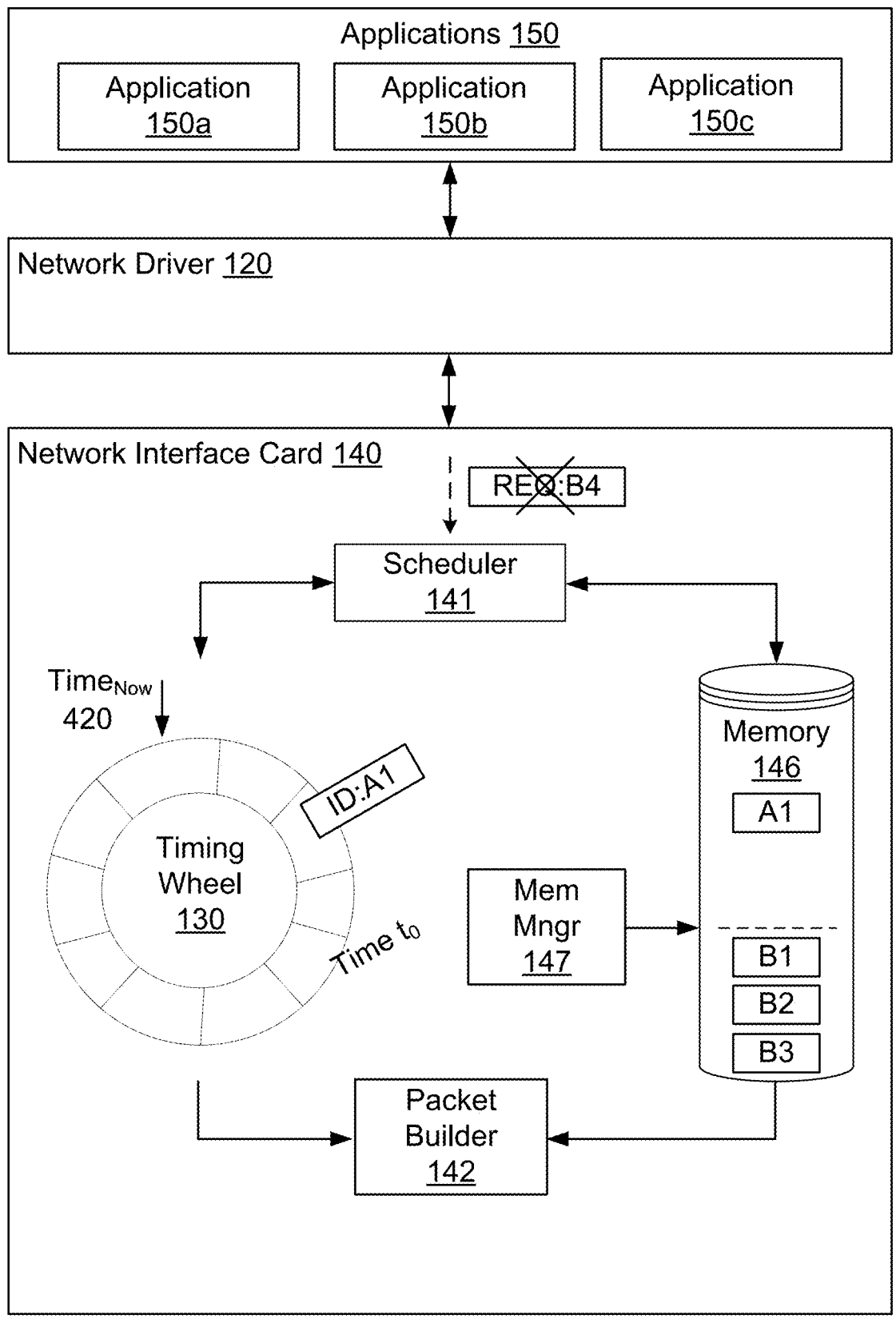
Figure 4C:
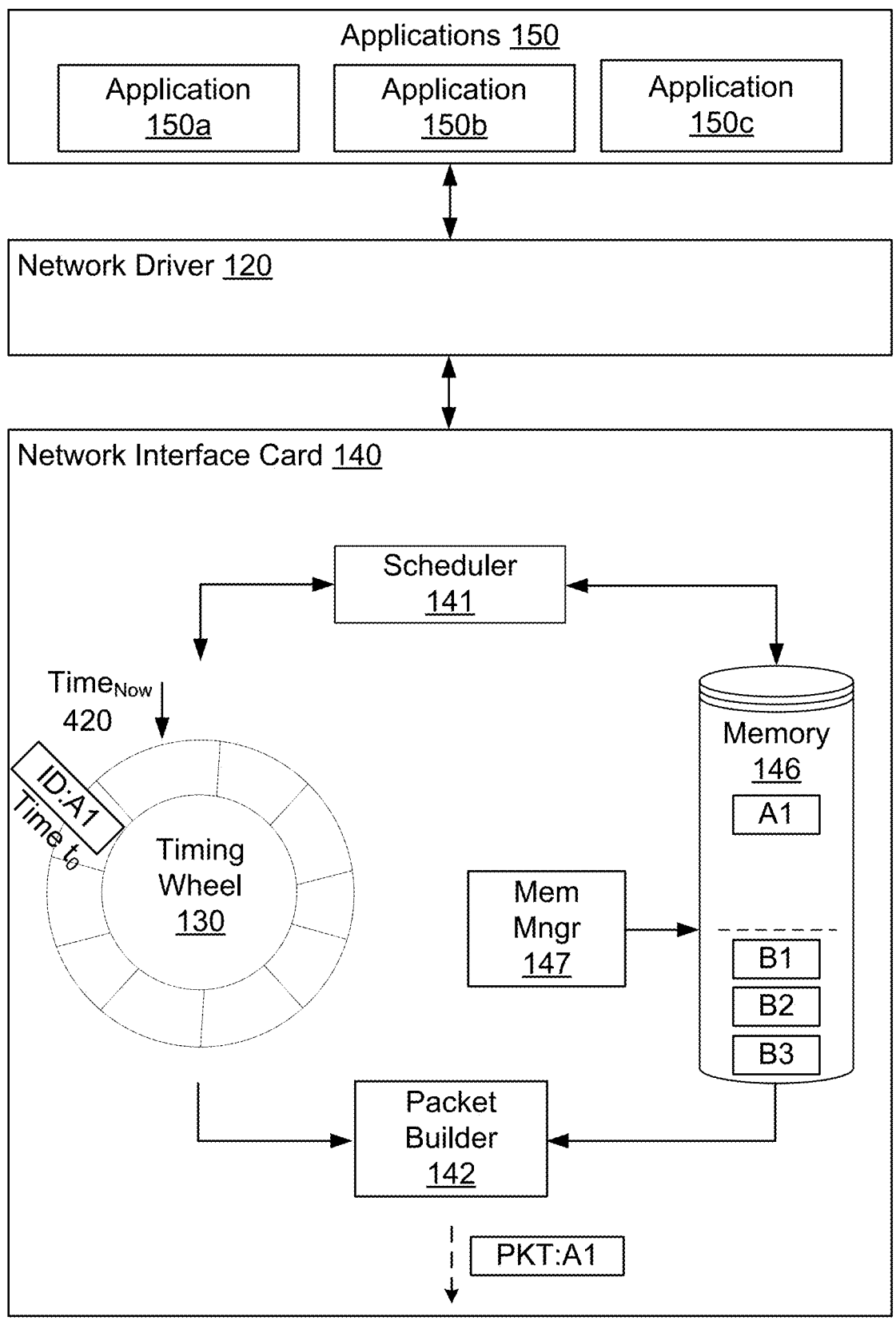

FIGS. 4A-4C are block diagrams representing example operations for shaping network traffic using a scheduler, time-indexed data structure, memory, memory manager, and packet builder as performed by a network interface card, such as the network interface card 140. In broad overview, and as shown in FIG. 4A, the network interface card 140 receives notifications of new communications from applications 150 (e.g., applications 150a, 150b and 150c) via the network driver 120. The notification, such as the notification labeled REQ:A1, can include a header (or portions of a header) and a set of pointers corresponding to memory locations in the host memory storing additional data for the packet header and for the packet payload. The network interface card 140 includes one or more memory devices 146 for storing instructions and data, and allocation logic such as a memory manager 147 for allocating portions of the memory 146 to different virtual machines, containers, or applications 150. In the example operations shown in FIGS. 4A-4C, each application 150 is treated as executing in a different virtual machine or container for simplicity's sake. The network interface card 140 includes a scheduler 141 to process packets in accordance with rate limiting algorithms or policies stored in memory 146. The network interface card 140 further includes a time-indexed data structure 130, also referred to as a timing wheel 130, to store packet identifiers, such as the packet identifier labeled ID:A1, according to their transmission time. The network interface card 140 also includes one or more packet builders 142 to generate packets based on the packet identifier and the associated set of pointers. If the network interface card 140 receives a notification of a new communication from an application, the scheduler 141 can determine whether the memory allocation in memory 146 associated with the particular virtual machine or container has capacity for handling the set of pointers associated with the packet. If the memory allocation is adequate for storing the set of pointers, the scheduler 141 can store the packet identifier in the timing wheel 130 and store the associated set of pointers in the memory 146. If the memory allocation lacks capacity for storing the set of pointers, the network interface card 140 can ignore the notification, essentially dropping the packet requested for transmission. When the transmission time indexed for the packet identifier has been reached (e.g. at $Time_{Now}$ 420) the timing wheel 130 can push the packet identifier to the packet builder 142 for generation of the packet. FIGS. 4A-4C illustrate these operations.

Referring to FIG. 4A, the network interface card 140 receives a notification of a new communication REQ:A1 at its scheduler 141 from the application 150a. The notification REQ:A1 corresponds to a data packet for transmission from the application 150a, via the network interface card 140. The notification REQ:A1 can include a header or header data and a set of pointers. The set of pointers can point to memory regions in the host memory storing data for the packet header and/or payload. At the network interface card 140, a set of pointers, in this case A1, is associated with an identifier, in this case ID:A1. An identifier is therefore associated with the received notification of the new communication, the packet for transmission, and the set of pointers to the data that will ultimately be used by the network interface card 140 to generate the packet.

The memory manager 147 has allocated space in the memory 146 for each virtual machine or container. In FIGS. 4A-4C, each application 150 is treated as executing in a separate virtual machine or container for the sake of illustrating operations of the network interface card 140 and its components. In FIG. 4A, the memory manager 147 has allocated space in the memory 146 for three sets of pointers from each of the virtual machines hosting the applications 150a and 150b, respectively. In practice, the memory allocation for a virtual machine may be for a single set of pointers or many sets of pointers. In some implementations, memory space may be allocated in terms of bytes, kilobytes, or megabytes, rather than by number of sets of pointers, and each set of pointers may be a different size, so that the number of sets of pointers that fit in a particular memory allocation depends on the aggregate size of the sets of pointers.

The scheduler 141 of the network interface card 140, as shown in FIG. 4A, receives the notification REQ:A1 from the application 150a, and checks the memory 146 for available capacity. In the example shown in FIG. 4A, memory 146 has capacity available in its allocation for the virtual machine executing the application 150a. The scheduler therefore adds a packet identifier associated with the notification to the timing wheel 130, and a set of pointers associated with the packet to the memory 146.

As further shown in FIG. 4A, the scheduler 141 processes the received notifications to determine a transmission time for each packet. The scheduler 141 may determine a transmission time for each packet by identifying the rate limiting algorithm or policy associated with the packet and assigning an initial or updated transmission time to the identifier associated with the packet. The scheduler 141 may retrieve a rate limiting algorithm or policy from memory 146 to determine the initial or updated transmission time for each packet. Received notifications may be identified by the scheduler 141 as belonging to a particular class of packets. Packets in a particular class may require a specific rate limiting algorithm or policy associated with the packet class. The scheduler 141 may utilize the specific rate limiting algorithm or policy to determine an initial or updated transmission time for each packet of the class. In some implementations, scheduler 141 may evaluate a packet transmission time requested by application 150 and determine if the requested transmission time exceeds the rate limiting algorithm or policy associated with the packet class (e.g., if transmission at the requested time would result in too high a transmission rate for the packet class given the transmission history of other recently transmitted packets or packets already scheduled for future transmission in that class). The scheduler 141 may process the notifications and determine that a transmission time requested by the application 150 violates the rate limit or policy associated with the packet class. If the rate limit or policy is exceeded or otherwise violated, the scheduler 141 may determine an updated transmission time that does not exceed or violate the rate limit or policy for each packet. The scheduler 141 may determine that a requested or updated transmission time is the present time and may execute instructions to immediately forward the identifier to the packet builder 142 for generation of the packet corresponding to the identifier.

As shown in FIG. 4A, scheduler 141 stores the identifier ID:A1 associated with the packet in the timing wheel 130 at a position associated with the transmission time determined for the packet. The timing wheel 130 may be a time-indexed data structure or queue capable of storing and extracting packet identifiers based on the determined transmission time of the associated packet. In some implementations, each time-slot in the timing wheel 130 stores a single data element or event (e.g., an identifier associated with a packet). In some implementations, each time-slot can store multiple data elements or events. The timing wheel 130 may include a preconfigured number of time-slots or positions and each time-slot or position may represent a specific increment of time. In some implementations, the number of time-slots or positions can be dynamically adjusted based on varying levels of data traffic and congestion at the network interface card 140. The timing wheel 130 may include any number of time-slots or positions with each time-slot defined as necessary to adequately process the volume of traffic to be shaped. The sum of all slots or positions in the timing wheel 130 represents the time horizon or forward queuing timeframe that the timing wheel 130 is capable of supporting. A suitable time horizon and timing wheel granularity (e.g., the number of time-slots), may be configured based on the rate-limit policy to be enforced. For example, to enforce a rate of 1 megabit (Mb) per second, a suitable time horizon would be 12 milliseconds. A suitable number of time-slots or positions for the timing wheel 130 may be in the range of 10-1,000,000 time-slots or positions. A suitable time horizon for the timing wheel 130 may be in the range of 10 microseconds-1 second. For example, as shown in FIG. 4A, the timing wheel 130 has 10 slots and each slot may represent 2 microseconds. Thus, the time horizon for the example timing wheel 130 shown in FIG. 4A is 20 microseconds and the granularity of the timing-wheel 130 is 2 microseconds. In some implementations, the timing wheel 130 will have a maximum time horizon beyond which no packet identifiers would be scheduled. The timing wheel 130 may not require storing packet identifiers with a timestamp older than now, as the packet with a transmission time older than now should be transmitted immediately. Once a slot in the timing wheel 130 becomes older than now the elements in the slot may be dequeued and prepared for transmission.

For example, as shown in FIG. 4A, assume that the packet associated with the packet identifier ID:A1 has been processed by the scheduler 141. A set of points associated with the identifier A1 may remain in the memory 146 and the scheduler 141 stores the identifier ID:A1 in the timing wheel 130 at a position associated with the transmission time determined for the packet associated with the identifier ID:A1. The packet identifier ID:A1 includes the transmission time $t_0$ as determined by the scheduler 141. The packet identifier ID:A1 is inserted into the timing wheel 130 at a timeslot corresponding to the transmission time $t_0$. The timing wheel 130 stores the packet identifier ID:A1 until it is determined that the transmission time determined for the packet associated with the identifier A1 has been reached. In some implementations, when $TimeN_{ow}$ become $t_0$, the timing wheel 130 can push the packet identifier ID:A1 to the packet builder. In some implementations, the scheduler 141 or the packet builder 142 may query the time-indexed data structure 130 with the current time to determine whether there are any packets that are to be transmitted. For example, the packet builder 142 may poll the data structure with the CPU clock time (or some other value representing the current time, such as a regularly incremented integer). The packet builder 142 may determine that the transmission time identified in packet identifier ID:A1 has been reached and accordingly generate the packet for transmission using the set of pointers A1.

As shown in FIG. 4B, the scheduler 141 processes the next notification. In this case, the scheduler receives a notification REQ:B4 from the application 150b. The scheduler checks the memory 146 for available capacity in the space allocated to the virtual machine or container executing the application 150b. In the example shown in FIG. 4A, the memory 146 lacks capacity for a set of pointers associated with the notification REQ:B4. The scheduler 141 therefore drops the notification without queuing a packet identifier in the timing wheel 130 or storing an associated set of pointers in the memory 146.

As shown in FIG. 4C, the current time has reached or passed $t_0$, the time at which the packet A1 was scheduled for transmission. The timing wheel 130 thus pushes the packet identifier ID:A1 to the packet builder 142 to packet generation and transmission. The packet builder 142 uses the packet identifier ID:A1 to retrieve the set of pointers A1 from the memory 146. The packet builder 142 uses the set of pointers A1 to retrieve packet header data and payload data from the host memory to generate the packet PKT:A1. The packet builder 142 can then send the packet PKT:A1 to a transceiver for transmission.

Following transmission of the packet, the transmission completion logic 144 can determine whether a packet associated with an identifier stored in the time-indexed data structure at a position associated with the reached time been successfully transmitted by the network interface card. If the transmission completion logic 144 determines that a packet associated with an identifier stored in the time-indexed data structure at a position associated with the reached time been successfully transmitted, the transmission completion logic 144 can communicate a transmission completion notification to the application 150 that has awaited receipt of a transmission completion notification from the network interface card 140 before forwarding additional data packets to the network interface card. An example operation of the transmission completion logic 144 is described in more detail below.

The transmission completion logic 144 can determine whether a packet associated with an identifier stored in the time-indexed data structure 130 at a position associated with the reached time has been successfully transmitted by the network interface card 140. For example, in response to a successful completion of the transmission of the packet A1 by the network interface card 140, the transmission completion logic 144 can inform the applications 150 of the successful transmission of the packets by communicating a message. In the event of multiple successful transmission completions, the transmission completion logic 144 can communicate a single message or multiple transmission completion notifications. Based on the notification of a transmission completion from the network interface card 140, the applications 150 determine that each packet associated with an identifier stored in the time-indexed data structure at a position associated with the reached time has been successfully transmitted by the network interface card 140.

In response to the transmission completion logic 144 determining that a packet associated with an identifier stored in the time-indexed data structure at a position associated with the reached time has been successfully transmitted, the transmission completion logic 144 can communicate a transmission completion notification to the application 150 that has awaited receipt of a transmission completion notification from the network interface card before forwarding additional data packets to the network interface card. In some implementations, each of the applications 150 can be configured to await receipt of a transmission completion notification from the network interface card 140 before forwarding additional packets to the network interface card. In some implementations, each of the applications 150 can be configured to await receipt of a transmission completion message for a packet of a particular class from the network interface card before forwarding additional packets of the same class to the network interface card.

FIG. 5 is a block diagram illustrating a general architecture for a computer system 1000 that may be employed to implement elements of the systems and methods described and illustrated herein, according to an illustrative implementation.

In broad overview, the computing system 1010 includes at least one processor 1050 for performing actions in accordance with instructions and one or more memory devices 1070 or 1075 for storing instructions and data. The illustrated example computing system 1010 includes one or more processors 1050 in communication, via a bus 1015, with at least one network interface driver controller 1020 with one or more network interface cards 1022 connecting to one or more network devices 1024, memory 1070, and any other devices 1080, e.g., an I/O interface. The network interface card 1022 may have one or more network interface driver ports to communicate with the connected devices or components. Generally, a processor 1050 will execute instructions received from memory. The processor 1050 illustrated incorporates, or is directly connected to, cache memory 1075.

In more detail, the processor 1050 may be any logic circuitry that processes instructions, e.g., instructions fetched from the memory 1070 or cache 1075. In many embodiments, the processor 1050 is a microprocessor unit or special purpose processor. The computing device 1000 may be based on any processor, or set of processors, capable of operating as described herein. The processor 1050 may be a single core or multi-core processor. The processor 1050 may be multiple processors. In some implementations, the processor 1050 can be configured to run multi-threaded operations. In some implementations, the processor 1050 may host one or more virtual machines or containers, along with a hypervisor or container manager for managing the operation of the virtual machines or containers. In such implementations, the methods shown in FIG. 3 and FIG. 5 can be implemented within the virtualized or containerized environments provided on the processor 1050.

The memory 1070 may be any device suitable for storing computer readable data. The memory 1070 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 1000 may have any number of memory devices 1070. In some implementations, the memory 1070 supports virtualized or containerized memory accessible by virtual machine or container execution environments provided by the computing system 1010.

The cache memory 1075 is generally a form of computer memory placed in close proximity to the processor 1050 for fast read times. In some implementations, the cache memory 1075 is part of, or on the same chip as, the processor 1050.

In some implementations, there are multiple levels of cache 1075, e.g., L2 and L3 cache layers.

The network interface driver controller 1020 manages data exchanges via the network interface driver 1022 (also referred to as network interface driver ports). The network interface driver controller 1020 handles the physical and data link layers of the OSI model for network communication. In some implementations, some of the network interface driver controller's tasks are handled by the processor 1050. In some implementations, the network interface driver controller 1020 is part of the processor 1050. In some implementations, a computing system 1010 has multiple network interface driver controllers 1020. The network interface driver ports configured in the network interface card 1022 are connection points for physical network links. In some implementations, the network interface controller 1020 supports wireless network connections and an interface port associated with the network interface card 1022 is a wireless receiver/transmitter. Generally, a computing device 1010 exchanges data with other network devices 1024 via physical or wireless links that interface with network interface driver ports configured in the network interface card 1022. In some implementations, the network interface controller 1020 implements a network protocol such as Ethernet.

The other network devices 1024 are connected to the computing device 1010 via a network interface driver port included in the network interface card 1022. The other network devices 1024 may be peer computing devices, network devices, or any other computing device with network functionality. For example, a first network device 1024 may be a network device such as a hub, a bridge, a switch, or a router, connecting the computing device 1010 to a data network such as the Internet.

The other devices 1080 may include an I/O interface, external serial device ports, and any additional co-processors. For example, a computing system 1010 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1000 includes an additional device 1080 such as a coprocessor, e.g., a math co-processor can assist the processor 1050 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A network interface card comprising:
   network interface card memory configured to store:
     a time-indexed data structure storing identifiers associated with respective communications to be transmitted by network interface card;
     sets of pointers, wherein:
       each set of pointers corresponds to one of the identifiers stored in the time-indexed data structure; and
       each pointer in each set of pointers points to a location in the network interface card memory or a location in a host memory of a host computing device to which the network interface device is coupled;
   scheduling logic configured to:
     receive a notification of a new communication originating from a source virtualized computing environment of a plurality of virtualized computing environments executing on the host computing device to be transmitted by the network interface card, wherein the notification includes header data and a set of pointers to data to be included in the communication;
     determine whether to drop the new communication or to schedule transmission of the new communication based on available capacity in the network interface card memory allocated to the source virtualized computing environment; and
     in response to determining to schedule transmission of the communication, store an identifier associated with the communication in the time-indexed data structure at a scheduled transmission time and store the set of pointers associated with the communication in the network interface card memory;
   packet generation logic configured to:
     upon arrival of a scheduled transmission time of a communication for which an identifier is stored in the time-indexed data structure, generate a data packet using the set of pointers stored in the network interface card memory associated with the communication;
   a transceiver configured to transmit the generated data packets; and
   transmission completion logic configured to, upon completion of transmission of a data packet generated for a communication, generate a transmission completion message to be communicated to an application executing in the source virtualized computing environment that originated the communication.

2. The network interface card of claim 1, wherein the set of pointers is stored as a scatter gather list.

3. The network interface card of claim 1, further comprising network interface card memory allocation logic configured to allocate portions of the network interface card memory amongst the plurality of virtualized computing environments.

4. The network interface card of claim 1, wherein the scheduling logic is further configured to calculate the scheduled transmission time for a communication based on a traffic shaping policy stored in the network interface card memory.

5. The network interface card of claim 4, wherein the scheduling logic is configured to calculate the scheduled transmission time based on the header data associated with the communication.

6. The network interface card of claim 4, wherein the traffic shaping policy includes a packet class rate policy or an aggregate rate policy.

7. The network interface card of claim 1, wherein the source virtualized computing environment refrains from requesting additional packet transmissions until receipt of a notification of completion of a previously requested packet transmission.

8. A method of network traffic shaping comprising:
   receiving, at a network interface card of a host computing device, a notification of a new communication originating from a source virtualized computing environment of a plurality of virtualized computing environments executing on the host computing device to be transmitted by the network interface card, wherein the notification includes header data and a set of pointers to data to be included in the communication;
   determining whether to drop the new communication or to schedule transmission of the new communication based on available capacity in a network interface card memory space allocated to the source virtualized computing environment;
   storing, in response to determining to schedule transmission of the communication:
     an identifier associated with the communication in a time-indexed data structure at a scheduled transmission time; and
     a set of pointers associated with the communication in the network interface card memory, wherein the set of pointers corresponds to the identifier stored in the time-indexed data structure and each pointer in the set of pointers points to a location in the network interface card memory or a location in a host memory of the host computing device;
   generating, upon arrival of a scheduled transmission time of the communication for which the identifier is stored in the time-indexed data structure, a data packet using the set of pointers stored in the network interface card memory associated with the communication;
   transmitting the generated data packet; and
   generating, upon completion of transmission of a data packet generated for a communication, a transmission completion message to be communicated to an application executing in the source virtualized computing environment that originated the communication.

9. The method of claim 8, comprising storing the set of pointers as a scatter gather list.

10. The method of claim 8, comprising allocating portions of the network interface card memory amongst the plurality of virtualized computing environments.

11. The method of claim 8, comprising calculating the scheduled transmission time for a communication based on a traffic shaping policy stored in the network interface card memory.

12. The method of claim 11, comprising calculating the scheduled transmission time based on the header data associated with the communication.

13. The method of claim 11, wherein the traffic shaping policy includes a packet class rate policy or an aggregate rate policy.

14. The method of claim 8, wherein the source virtualized computing environment refrains from requesting additional packet transmissions until receipt of a notification of completion of a previously requested packet transmission.

15. A non-transitory computer-readable medium having stored thereon instructions configured to cause one or more processors of a network interface card of a host computing device to execute a method of network traffic shaping comprising:
  receiving a notification of a new communication originating from a source virtualized computing environment of a plurality of virtualized computing environments executing on the host computing device to be transmitted by the network interface card, wherein the notification includes header data and a set of pointers to data to be included in the communication;
  determining whether to drop the new communication or to schedule transmission of the new communication based on available capacity in a network interface card memory space allocated to the source virtualized computing environment;
  storing, in response to determining to schedule transmission of the communication:
    an identifier associated with the communication in a time-indexed data structure at a scheduled transmission time; and
    a set of pointers associated with the communication in the network interface card memory, wherein the set of pointers corresponds to the identifier stored in the time-indexed data structure and each pointer in the set of pointers points to a location in the network interface card memory or a location in a host memory of the host computing device;
  generating, upon arrival of a scheduled transmission time of the communication for which the identifier is stored in the time-indexed data structure, a data packet using the set of pointers stored in the network interface card memory associated with the communication;
  generating, upon completion of transmission of a data packet generated for a communication, a transmission completion message to be communicated to an application executing in the source virtualized computing environment that originated the communication.

16. The computer-readable medium of claim 15, wherein the method comprises storing the set of pointers as a scatter gather list.

17. The computer-readable medium of claim 15, wherein the method comprises allocating portions of the network interface card memory amongst the plurality of virtualized computing environments.

18. The computer-readable medium of claim 15, wherein the method comprises calculating the scheduled transmission time for a communication based on a traffic shaping policy stored in the network interface card memory.

19. The computer-readable medium of claim 18, wherein the method comprises calculating the scheduled transmission time based on the header data associated with the communication.

20. The computer-readable medium of claim 18, wherein the traffic shaping policy includes a packet class rate policy or an aggregate rate policy.

* * * * *